A. J. PRANCE.
SCREW CUTTING TAP.
APPLICATION FILED NOV. 19, 1913.
1,132,536. Patented Mar. 16, 1915.
2 SHEETS—SHEET 1.
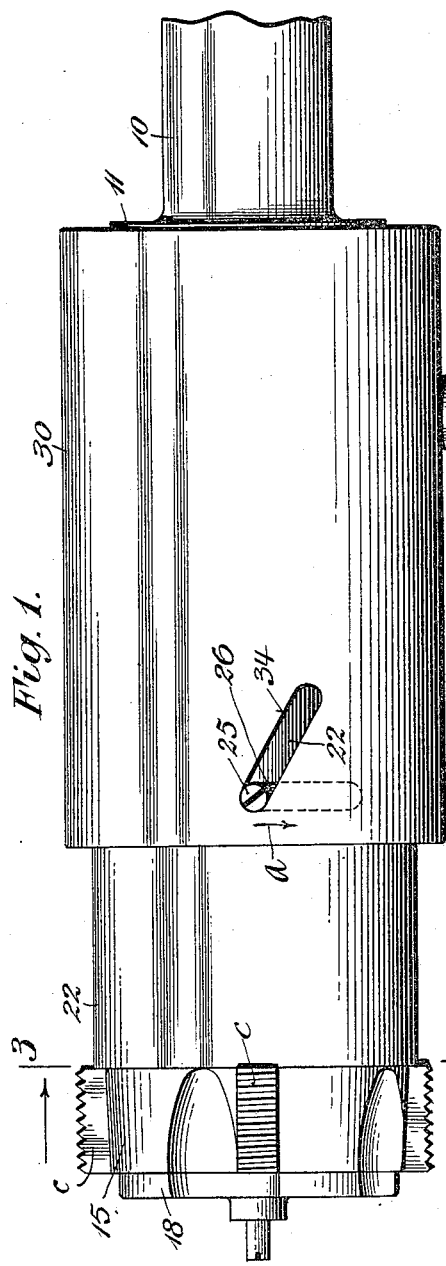
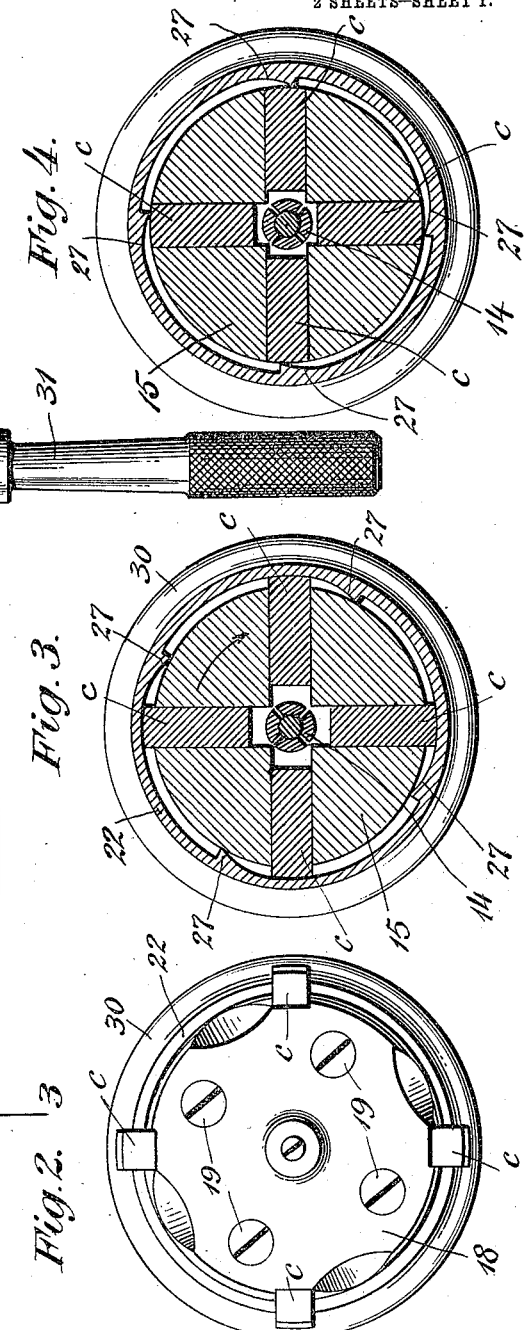
WITNESSES:
INVENTOR
A. J. Prance,

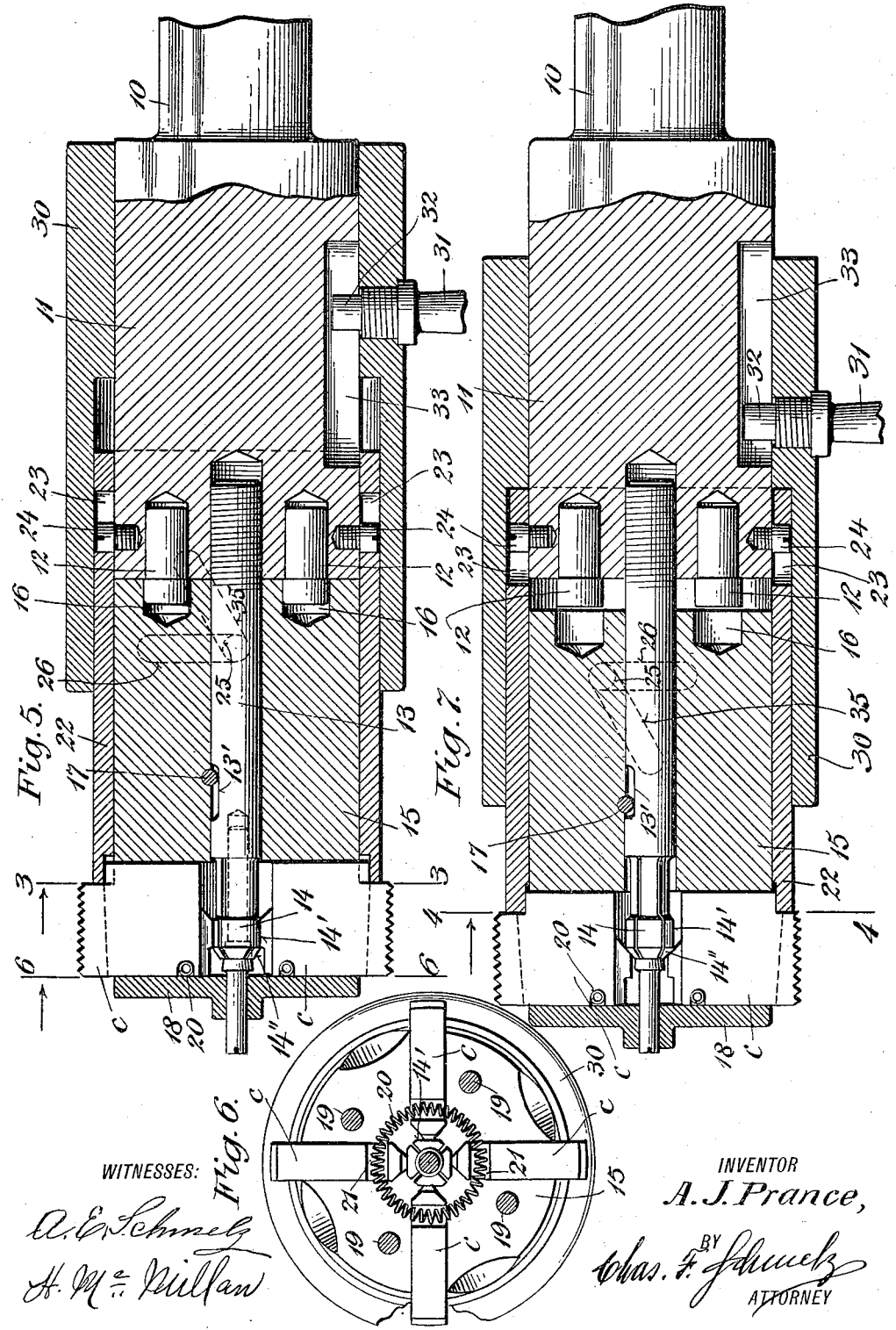

UNITED STATES PATENT OFFICE.

ALBERT J. PRANCE, OF DETROIT, MICHIGAN, ASSIGNOR TO MURCHEY MACHINE AND TOOL CO., OF DETROIT, MICHIGAN, A CORPORATION OF MICHIGAN.

SCREW-CUTTING TAP.

1,132,536.

Specification of Letters Patent.

Patented Mar. 16, 1915.

Application filed November 19, 1913. Serial No. 801,781.

*To all whom it may concern:*

Be it known that I, ALBERT J. PRANCE, a citizen of the United States, residing at Detroit, in the county of Wayne and State of Michigan, have invented certain new and useful Improvements in Screw - Cutting Taps, of which the following is a specification.

This invention relates to taps for cutting screw threads, and more especially to that class in which the chasers may be withdrawn from the work as soon as they have performed their functions.

More particularly this invention relates to screw-cutting taps, and it has for one of its objects the provision of a tool of this character which may be used in connection with a power-driven machine tool, the chasers being automatically withdrawn by the advance movement of the tool and work relatively to each other during the screw-cutting operation.

The invention has furthermore for its object the improved construction of the tap which comprises a two-part chaser head, the chaser part of which carries a member whereby the chasers are automatically retracted or withdrawn from the work by the drag established between the chasers and the work, after the principal or shank member of the chaser head has come to a standstill as far as the feeding-in movement into the work is concerned.

Further objects of the invention will hereinafter appear and be particularly defined in the claims.

The invention has been clearly illustrated in the accompanying drawings in which similar characters denote similar parts and in which:—

Figure 1 is a side view of a tap embodying my invention. Fig. 2 is a front view thereof. Fig. 3 is a cross section on line 3—3 of Figs. 1 and 5, illustrating the cams whereby the chasers are retracted. Fig. 4 is a view similar to Fig. 3, but illustrates the cams in position where they have retracted the chasers. Fig. 5 is a central longitudinal section of my improved tap, the parts being shown with the chasers extended and in full cutting operation. Fig. 6 is a front view of the tap, the front plate or cover having been removed, on line 6—6 of Fig. 5. Fig. 7 is another longitudinal section of the tap illustrating the chasers in their retracted positions.

Referring to the drawings, the numeral 10 denotes the shank of the tap having an enlarged head portion 11 which carries in its front face a pair of diametrically opposite driving pins 12, also a centrally disposed stud 13, the front end of which has a head 14. The cylindrical face 14' of this head is adapted to be engaged with the inner faces of the chasers C, which are thus maintained in their distended or working positions, while the beveled face 14'' of the head 14 is such as to permit said chasers to move toward the center of the tool at the end of the screw-cutting operation, such condition being particularly shown in Fig. 7. The chasers C are therein shown as being four in number and movable toward and away from the center in slots provided therefor in a head 15 hereinafter designated as "chaser-head." This chaser-head is provided in its rear face with a pair of diametrically opposite apertures 16 adapted to receive the heads of the driving pins 12 above referred to, when the chaser head is in its rearward position shown in Fig. 5. Inasmuch as the front head 14 of the central pin 13 has the flat faces 14' against which the inner faces of the chasers will seat themselves, it becomes necessary to maintain the position of the pin relative to the chaser head so that these flat faces are always opposite the chasers, and for this reason I provide a pin 17 passing through said chaser head and engaging a flattened face 13' on the pin 13, the latter being formed by cutting away a portion of the same so that this pin 17 acts as a key without, however, interfering with the longitudinal movement of the head relatively to the pin.

The several chasers are held in the head for radial sliding movement by a cover 18 secured in place by screws 19 as clearly shown, and means are provided whereby the several chasers are normally drawn inward toward the center, so as to hold them firmly against the pin head 14, these means consisting substantially of a spring 20 disposed within notches or recesses 21 provided in the front faces of the several chasers respectively.

The present device has for its principal object the provision of means whereby the chasers are positively drawn inward at the end of the screw-cutting operation, to loosen them from the work, regardless of whether the spring 20 properly performs its function or not, and for this purpose I employ a sleeve 22 fitting over both the heads 11 and 15 and having near its rear end a pair of diametrically opposite longitudinal slots 23 through which screws 24 pass into the shank head 11, so that therefore said sleeve 22 is nonrotatable relatively to the shank head 11, but may have a longitudinal movement relatively thereto. On the other hand, the sleeve 22 is held against longitudinal movement on the chaser head 15, for the reason that a screw 25 (see also Fig. 1) passes through a lateral slot 26 formed in the sleeve 22, into the main body of the chaser head 15. It will therefore be understood that the sleeve 22 will at all times be maintained in its longitudinal position relatively to the chaser head, while at the same time said chaser head may have a rotative movement relatively to the sleeve. This rotative movement in the direction of the arrow in Fig. 3 is utilized for the purpose of bringing the chasers into contact with a series of cams 27 (see Figs. 3, 4, and 5), from the position shown in Fig. 3 to that shown in Fig. 4, thus driving all of the chasers inward or toward the center of the tool, in which position the chasers are clear of the work. The means whereby this rotative movement of the chaser head 15 relatively to the sleeve 22 is effected, comprises an outer member or sleeve 30 which is provided with a handle 31 for resetting purposes as will hereinafter appear, while said handle is also provided with a projection 32 adapted to travel within a recess 33 longitudinally disposed within the shank body 11, thus holding said sleeve 30 against rotation on the shank body 11.

At its forward end the sleeve 30 is provided with a pair of diametrically opposite cam slots 34—35 in which the head ends of the pins 25 referred to are caused to travel when the shank 10 has ceased to move forward, while at the same time the chaser head 15 still continues in its forward movement, due to the rotation of the same and the consequent advance of said head with the chasers into the work.

From the foregoing it should be understood that the two pins 25 are screwed into the chaser head 15, while their outer ends are in engagement with the slots of both of the sleeves 22 and 30, and it is the particular function of the cam slots 34 and 35 to cause the rotative or angular displacement of the chaser head 15 relatively to the sleeve 22 to bring the chaser into operation relatively to the cams 27, this function being performed as follows:—

Let it be supposed that the shank 10 and its head 11 are held stationary or nonrotatively in the sliding tail-stock of a machine, while the work to be operated upon is clamped into a head to which rotative power is imparted but which has no sliding movement. It will then be understood that the advance movement of the tap, in its entirety, into the work will be in conformity with the pitch of the thread of the chasers, and that the work can only rotate while the tap has only a longitudinal movement. The thread-cutting operation will continue as long as the driving or holding engagement between the shank head 11 and the chaser head 15 (by the pins 12) is maintained. It therefore follows that when the shank 10 is held against further advancing movement (toward the left in Fig. 5) the continued rotation of the work will gradually pull the chaser head 15 forward until the rear face of the latter is clear of the pins 12. As soon as the movement of the chaser head is such as to leave the driving pins 12, by virtue of the shank head 11 being stationary, the pins 25 will move forward with the chaser head, therefore pulling the sleeve 22 and also the sleeve 30 forward, together. This forward movement of the chaser head will also result in bringing the chasers into the position shown in Fig. 7 or in other words so that their inner faces clear the cylindrical faces 14 of the pin 13, so that then they may be drawn together by the spring 20 above described. If, however, the spring should fail to act, the chasers will be positively drawn together, as soon as the chaser head is clear of the driving pins, as follows:—As soon as the chaser head 15 is clear of the driving pins 12, the rotating work will drag the chaser head 15 rotatively with it, therefore moving the pins 25 along in the slots 26 of the sleeve 22 which latter is held against rotation by virtue of the screws 24. On the other hand the movement of the pins 25, (referring now to Fig. 1) in the direction of arrow A, would tend to rotate the outer sleeve 30 in the same direction. But, inasmuch as this sleeve 30 cannot rotate on the shank head 11 by virtue of the pin and slot connection 32 and 33, the movement of the pins 25 in the slots 34 and 35 will result in camming the sleeve 30 forward, this latter movement being of no particular benefit to the releasing action of the chasers, but it serves to bring the sleeve 30 into position, so that it can then be moved by hand to bring the chasers again into their distended position.

Of course, it is understood that when the chasers are in their contracted condition, the tap in its entirety can be bodily slid out of the work.

When the tap is to be reset, that is to say so that the chasers will be returned again to their distended positions shown in Fig. 5, the operator does nothing but simply slide the sleeve 30, by the handle 31, from the position shown in Fig. 7 to that shown in Fig. 5. By this movement of the sleeve 30 toward the right, the slots 34 and 35 will rotate the chaser body 15 backwardly, without, however, at first disturbing the sleeve 22. When the chaser body has been turned until the chasers are again free of the cams 27, the pins 25 are disposed within the left-hand ends of the slots 34 and 35, so that consequently, when said sleeve 30 is then moved still farther toward the right, the chaser head 15, together with the chasers C, will be pulled toward the right, therefore causing the chasers to ride up on the inclined or beveled faces 14″ of the pin head 14, thus bringing the chasers back into their normal or working positions, while at the same time the chaser head is again in full engagement with the driving pins 12 of the shank head.

Changes may be made in the general organization, as well as in the particular construction of some of the elements of my improved device without departing from the spirit of the invention, especially in the formation of the actuating slots in the outer sleeve and also in the manner of connecting and disconnecting the shank head and chaser head for coöperation. Likewise, it should be understood that while in the preceding specification the shank head has been described as being stationary while the work has been mentioned as being rotating, this condition may be reversed, that is to say the work may be held stationary, and the tap may be rotated, the operation and functions of the several parts remaining the same.

I claim:—

1. A screw-cutting tap comprising a shank-head, a chaser head movable into and out of engagement therewith, chasers carried by the chaser head, a chaser-distending member carried by the shank head having a sliding-key connection with the chaser head for holding said chasers in their distended positions during the thread-cutting operation, and a device for retracting said chasers subsequently to the release of the chaser head from the shank head.

2. A screw-cutting tap comprising a shank head, a chaser head one being longitudinally movable relatively to the other, chasers carried by the chaser head, a chaser-distending member carried by the shank head and having a sliding-key connection with the chaser head for holding said chasers in their distended positions during the thread-cutting operation, an inner sleeve corotatively interlocked with the shank head and movable longitudinally with the chaser head, and means carried by said sleeve for positively retracting said chasers.

3. A screw-cutting tap comprising a shank head, a chaser head one being longitudinally movable relatively to the other, chasers carried by the chaser head, a chaser-distending member carried by the shank head and having a sliding key connected with the chaser head for holding said chasers in their distended positions during the thread-cutting operation, an inner sleeve corotatively interlocked with the shank head and movable longitudinally with the chaser head, and cams formed on the forward end of said sleeve for positively retracting said chaser.

4. A screw-cutting tap comprising a shank head, a chaser head, chasers carried thereby, means for locking said heads against rotation relatively to each other during the thread-cutting operation and adapted to release each other upon a predetermined longitudinal movement of the chaser head relatively to the shank head, an inner sleeve movable longitudinally with the chaser head and corotatively having a pin-and-slot connection with and for interlocking it with the shank head, and cams formed on the forward end of said sleeve adapted to engage the outer portions of said chasers for positively retracting the same subsequently to the release of the chaser head from the shank head.

5. A screw-cutting tap comprising a shank head, a chaser head movable relatively thereto, chasers carried thereby, a pin carried by one head and adapted to enter an aperture in the other head for holding said heads against rotation relatively to each other during the thread-cutting operation, and adapted to release the same upon a predetermined longitudinal movement of the chaser head relatively to the shank head, an inner sleeve, cams carried by said sleeve for positively retracting said chasers by the rotation of the chaser head relatively to the sleeve, said sleeve having a longitudinal pin-and-slot connection with the shank head, and having a peripheral pin-and-slot connection with the chaser-head to prevent longitudinal movement thereof relatively to said sleeve.

6. A screw-cutting tap comprising a shank head, a chaser head, chasers carried thereby, a pin carried by one head and adapted to enter an aperture in the other head for locking said heads against rotation relatively to each other during the thread-cutting operation and adapted to release the same upon a predetermined longitudinal movement of the chaser head relatively to the shank head, a sleeve having a longitudinal slot near its rear end, a pin passing through said slot and secured in the shank head, and cams formed on the forward end of said sleeve for positively retracting the chasers by the rotation of the chaser head relatively to the shank head, due to the engagement of the chasers with the work, said sleeve having a pin-and-slot connection with the chaser-head to prevent longitudinal movement of the parts relatively to each other without interfering with a partial rotation of one part relatively to the other.

7. A screw-cutting tap comprising a shank head, a chaser head, chasers carried thereby, a chaser-distending member carried by said shank head for holding said chasers in distended positions, means for holding said heads against rotation relatively to each other during the thread-cutting operation, means for releasing said chaser head from the shank head upon a predetermined longitudinal movement of the chaser head relatively to the shank head, a sleeve corotatively interlocked with the shank head and movable longitudinally with the chaser head, cams formed on the forward end of said sleeve, and means for rotating said chaser head subsequently to its release from the shank head to bring said cams into engagement with the chasers for positively retracting the same.

8. A screw-cutting tap comprising a stationary shank head, a chaser head adapted to be rotated relatively to the shank head by the engagement existing between the chasers and the work, means for locking said heads against rotation relatively to each other during the thread-cutting operation, means for releasing said heads from each other upon a predetermined longitudinal movement of the chaser head relatively to the shank head, a chaser-distending member carried by said shank head for holding said chasers in distended position, a sleeve corotatively interlocked with the shank head, and movable longitudinally with the chaser head, and cams formed on the forward end of said sleeves for positively retracting said chasers.

9. A screw-cutting tap comprising a shank head, a chaser head, chasers carried by said shank head, a chaser-distending member formed by said shank head and having a beveled head engaging the inner faces of said chasers, resilient means for normally holding said chasers in contact with said beveled head, an inner sleeve having cams at its forward end, means for rotating said chaser head subsequently to its release from the shank head to bring said chasers into engagement with the cams for positively retracting said chasers.

10. A screw-cutting tap comprising a shank head, a chaser head, chasers carried by said shank head, a chaser-distending member carried by said shank head and having a beveled head engaging the inner faces of said chasers, a spring engaging all of said chasers for normally holding said chasers in contact with said beveled head, an inner sleeve having cams at its forward end, means for rotating said chaser head subsequently to its release from the shank head to bring said chasers into engagement with the cams for positively retracting said chasers.

11. A screw-cutting tap comprising a shank head, a chaser head movable longitudinally relatively thereto, chasers carried by the chaser head, means for locking said heads against rotation relatively to each other during the thread-cutting operation, a sleeve rotatable on, and movable longitudinally with, the chaser-head, cams formed on the forward end of said sleeve to retract said chasers, a device for rotating said chaser head to release said chasers from the retracting cams, and a chaser-distending member carried by the shank-head to hold the chasers in their outward work-engaging positions.

12. A screw-cutting tap comprising a shank head, a chaser head, chasers carried thereby, means for locking said heads against rotation relatively to each other during the thread-cutting operation, a sleeve, cams formed on the forward end of said sleeve to retract the chasers, and a device for rotating said chaser head to release said chasers from the cams and subsequently moving the chaser head into locked engagement with the shank head.

13. A screw-cutting tap comprising a shank head, a chaser head, chasers carried thereby, means for locking said heads against rotation relatively to each other during the thread-cutting operation, an inner sleeve, cams formed on the forward end of said sleeve to retract the chasers, and a device having a cam slot for rotating said chaser head to release said chasers from the retracting cams.

14. A screw-cutting tap comprising a shank head, a chaser head, chasers carried thereby, means for locking said heads against rotation relatively to each other during the thread-cutting operation, an inner sleeve, cams formed on the forward end of said sleeve, an outer sleeve mounted for longitudinal movement of the shank head and having a cam slot, and a pin adapted to travel in said cam slot and secured in the chaser head, for rotating the latter to release the chasers from the retracting cams.

15. A screw-cutting tap comprising a shank head, a chaser head, chasers carried thereby, means for locking said heads against rotation during the thread-cutting operation, an inner sleeve having a partial circumferential slot, cams formed on the forward end of said sleeve adapted to retract said chasers, an outer sleeve mounted for longitudinal movement on the shank head and having a cam slot, and a pin secured in the chaser head and passing through both of said slots for resetting the chasers in their distended positions.

In testimony whereof I affix my signature in presence of two witnesses.

ALBERT J. PRANCE.

Witnesses:
M. V. BUNYAN,
M. L. COOPER.

Copies of this patent may be obtained for five cents each, by addressing the "Commissioner of Patents, Washington, D. C."